(12) United States Patent
Pulbere et al.

(10) Patent No.: US 10,546,026 B2
(45) Date of Patent: Jan. 28, 2020

(54) ADVANCED SEARCH-TERM DISAMBIGUATION

(71) Applicant: International Business Machines Corporation, Armonk, NY (US)

(72) Inventors: Alexandru Pulbere, Ottawa (CA); Craig A. Statchuk, Kars (CA); Changying Sun, Ottawa (CA)

(73) Assignee: International Business Machines Corporation, Armonk, NY (US)

(*) Notice: Subject to any disclaimer, the term of this patent is extended or adjusted under 35 U.S.C. 154(b) by 185 days.

(21) Appl. No.: 15/475,547

(22) Filed: Mar. 31, 2017

(65) Prior Publication Data

US 2018/0285457 A1  Oct. 4, 2018

(51) Int. Cl.
*G06F 17/30* (2006.01)
*G06F 16/951* (2019.01)
*G06F 16/33* (2019.01)
*G06F 16/9535* (2019.01)
*G06F 16/2457* (2019.01)
*G06F 16/9032* (2019.01)

(52) U.S. Cl.
CPC ...... *G06F 16/951* (2019.01); *G06F 16/24578* (2019.01); *G06F 16/334* (2019.01); *G06F 16/90324* (2019.01); *G06F 16/9535* (2019.01)

(58) Field of Classification Search
CPC .. G06F 16/951; G06F 16/334; G06F 16/9535; G06F 16/24578
USPC .................................................. 707/600–899
See application file for complete search history.

(56) References Cited

U.S. PATENT DOCUMENTS

| 7,562,069 | B1 | 7/2009 | Chowdhury et al. |
| 7,895,221 | B2 | 2/2011 | Colledge et al. |
| 8,275,803 | B2 | 9/2012 | Brown et al. |
| 9,043,350 | B2 | 5/2015 | Tomko et al. |
| 9,262,527 | B2 | 2/2016 | Geller et al. |
| 2009/0287678 | A1 | 11/2009 | Brown et al. |
| 2011/0066587 | A1 | 3/2011 | Ferrucci et al. |
| 2011/0125734 | A1 | 5/2011 | Duboue et al. |

(Continued)

OTHER PUBLICATIONS

List of Patents and Patent Applications Treated as Related, Nov. 29, 2018, 2 pages.

(Continued)

*Primary Examiner* — Isaac M Woo
(74) *Attorney, Agent, or Firm* — Francis Lammes; Stephen J. Walder, Jr.; Richard A. Wilhelm

(57) ABSTRACT

A mechanism is provided for advanced search-term disambiguation. Responsive to detecting a search term being entered into an autocomplete search field of a search engine, a determination is made of a set of terms from a storage device upon which a search is to be performed. For each term in the set of terms, a determination is made of a semantic distance and independence ($S_{di}$) score to each term candidate in a set of term candidates. The results of the semantic distance and independence ($S_{di}$) scores are ranked and then pruned down to a predetermined number of autocomplete results. A subset of term candidates associated with the predetermined number of autocomplete results from the set of term candidates is then presented to a user as autocomplete suggestions to the search.

12 Claims, 6 Drawing Sheets

(56) References Cited

U.S. PATENT DOCUMENTS

| | | |
|---|---|---|
| 2013/0007055 A1 | 1/2013 | Brown et al. |
| 2013/0018652 A1 | 1/2013 | Ferrucci et al. |
| 2013/0041878 A1 | 2/2013 | Satyanarayana et al. |
| 2013/0066886 A1 | 3/2013 | Bagchi et al. |
| 2014/0040275 A1 | 2/2014 | Dang et al. |
| 2015/0058309 A1* | 2/2015 | Cho .................. G06F 16/9535 707/706 |

OTHER PUBLICATIONS

High, Rob, "The Era of Cognitive Systems: An Inside Look at IBM Watson and How it Works", IBM Corporation, Redbooks, Dec. 12, 2012, 16 pages.

McCord, M.C. et al., "Deep parsing in Watson", IBM J. Res. & Dev. vol. 56 No. 3/4 Paper 3, May/Jul. 2012, pp. 3:1-3:15.

Yuan, Michael J., "Watson and Healthcare, How natural language processing and semantic search could revolutionize clinical decision support", IBM Corporation, developerWorks, http://www.ibm.com/developerworks/industry/library/ind-watson/, Apr. 12, 2011, pp. 1-14.

\* cited by examiner

ADVANCED SEARCH-TERM DISAMBIGUATION

BACKGROUND

The present application relates generally to an improved data processing apparatus and method and more specifically to mechanisms for advanced search-term disambiguation.

The Internet is a global network of computers and networks joined together by means of gateways that handle data transfer and the conversion of messages from a protocol of the sending network to a protocol used by the receiving network. On the Internet, any computer may communicate with any other computer with information traveling over the Internet through a variety of languages, also referred to as protocols. The set of protocols used on the Internet is called transmission control protocol/Internet Protocol (TCP/IP).

The Internet has revolutionized communications and commerce, as well as being a source of both information and entertainment. With respect to transferring data over the Internet, the World Wide Web environment, also referred to simply as "the Web," is used. The Web is a mechanism used to access information over the Internet. In the Web environment, servers and clients effect data transaction using the hypertext transfer protocol (HTTP), a known protocol for handling the transfer of various data files, such as text files, graphic images, animation files, audio files, and video files.

On the Web, the information in various data files is formatted for presentation to a user by a standard page description language, the hypertext markup language (HTML). Documents using HTML are also referred to as Web pages. Web pages are connected to each other through links or hyperlinks. These links allow for a connection or link to other Web resources identified by a universal resource identifier (URI), such as a uniform resource locator (URL).

A browser is a program used to look at and interact with all of the information on the Web. A browser is able to display Web pages and to traverse links to other Web pages, Resources, such as Web pages, are retrieved by a browser, which is capable of submitting a request for the resource. This request typically includes an identifier, such as, for example, a URL As used herein, a browser is an application used to navigate or view information or data in any distributed database, such as the Internet or the World Wide Web.

Given the amount of information available through the World Wide Web, search engines have become valuable tools for finding content that is relevant to a given user. A search engine is a software program or Web site that searches a database and gathers and reports information that contains or is related to specified terms. However, given the vast amount of information on the Internet, search results often include millions, or even tens of millions, of matching files, which are referred to as "hits." Many of these hits may be irrelevant to the user's intended search. For example, if a user were to request a search of the term "mercury," the results could include hits related to the element, the automobile manufacturer, the record label, the Roman god, the NASA manned spaceflight project, or some other category.

Once solution to this problem is to include more terms in the search request to disambiguate the search. In the above example, the user may refine the search to include "mercury AND car." However, it is up to the user to determine which terms to add to refine the search.

One high tech solution is to use a clustering search engine, which groups results of the search into clusters. These search engines are metasearch engines, which send user requests to several other search engines and/or databases and return the results from each one. They allow users to enter their search criteria only one time and access several search engines simultaneously.

A cluster is a group of similar topics that are related to the original query. The clusters are presented to the user through folders. The aim of this search engine technique is to organize numerous search results into several meaningful categories (clusters). The user gets an overview of the available themes or topics. Via one or two clicks on a folder and/or subfolders, the user may arrive at relevant search results that would be too far down in the ranking of a traditional search engine. In addition, the user may view similar results together in folders rather than scattered throughout a seemingly arbitrary list. While clustering search engines organize results into categories, these categories are naïve of the intention of the user. Given only a search query, no one category can be given a higher relevancy than any other. In addition, the algorithm used by a typical clustering engine produces human readable category names that may often be ambiguous themselves.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method, in a data processing system, is provided for advanced search-term disambiguation. The illustrative embodiment determines a set of terms from a storage device upon which a search is to be performed in response to detecting a search term being entered into an autocomplete search field of a search engine. For each term in the set of terms, the illustrative embodiment determines a semantic distance and independence ($S_{di}$) score to each term candidate in a set of term candidates. The illustrative embodiment ranks results of the semantic distance and independence ($S_{di}$) scores. The illustrative embodiment prunes the ranked results down to a predetermined number of autocomplete results. The illustrative embodiment presents a subset of term candidates associated with the predetermined number of autocomplete results from the set of term candidates to a user as autocomplete suggestions to the search.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
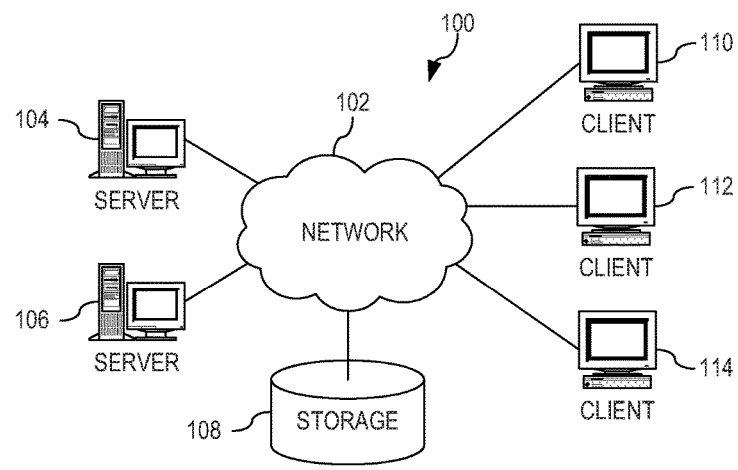
FIG. 1 is an example diagram of a distributed data processing system in which aspects of the illustrative embodiments may be implemented.

The illustrative embodiments provide mechanisms for advanced search-term disambiguation. As noted above, while clustering search engines may organize results into categories, these categories are naïve of the intention of the user. Currently, many of the clustering search engines attempt to disambiguate the search through follow-up questions. Keeping with the previous example using the term "mercury," current clustering search engines may issues a question to the user, such as "Did you mean mythology related to Mercury?" in order to disambiguate a search term "mercury". However, other clustering search engines may use facets or concepts to show groups of results that are related to a given concept (facet), such as matching concepts for "mercury": mythical god (22), periodic table element (17), planet (12), etc. This clustering is then followed by "relevance scoring" that indicates confidence in results:

About The God Mercury
Mercury is the son of Jupiter and Maia, one of the Pleiades. Mercury is comparable to the Greek good Hermes . . . Relevance 100%
Toxicity of Mercury
Poisoning can result from mercury vapor inhalation, mercury ingestion, mercury injection, and absorption of mercury through the skin . . . Relevance 88%

Thus, search-term disambiguation that is performed after an initial search query that asks a question or requires the operator to pick from a list of choices, while successful, is gauged by a time to receive correct results where any activity that exceeds an arbitrary time limit may result in user dissatisfaction or outright search abandonment (i.e., a search process that takes more than 5 seconds). Further, while group clustering and relevance scoring may work, the results of group clustering and relevance scoring are only good until the results are not correct. That is, providing relevance of 100% for a totally wrong answer serves to hurt credibility and trust that may shorten the arbitrary time limit that fosters user dissatisfaction or encourages search abandonment.

The illustrative embodiments provide mechanisms for advanced search-term disambiguation. That is, the mechanisms of the illustrative embodiment utilizes a measure of difference and orthogonality between related terms identified from the enterprise database on which the search is being performed to automatically disambiguate the search terms before search results are shown. The mechanisms operate to disambiguate the search terms as the initial search terms are being entered into the query. By disambiguating the search terms as they are being entered, the search may be performed correctly the first time and does not require questioning after the search has been performed or providing results based on relevance that may not in fact be relevant at all. Thus, the mechanisms of the illustrative embodiments provide more relevant results in less elapsed time, that in turn, provide better satisfaction and less chance of search abandonment.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
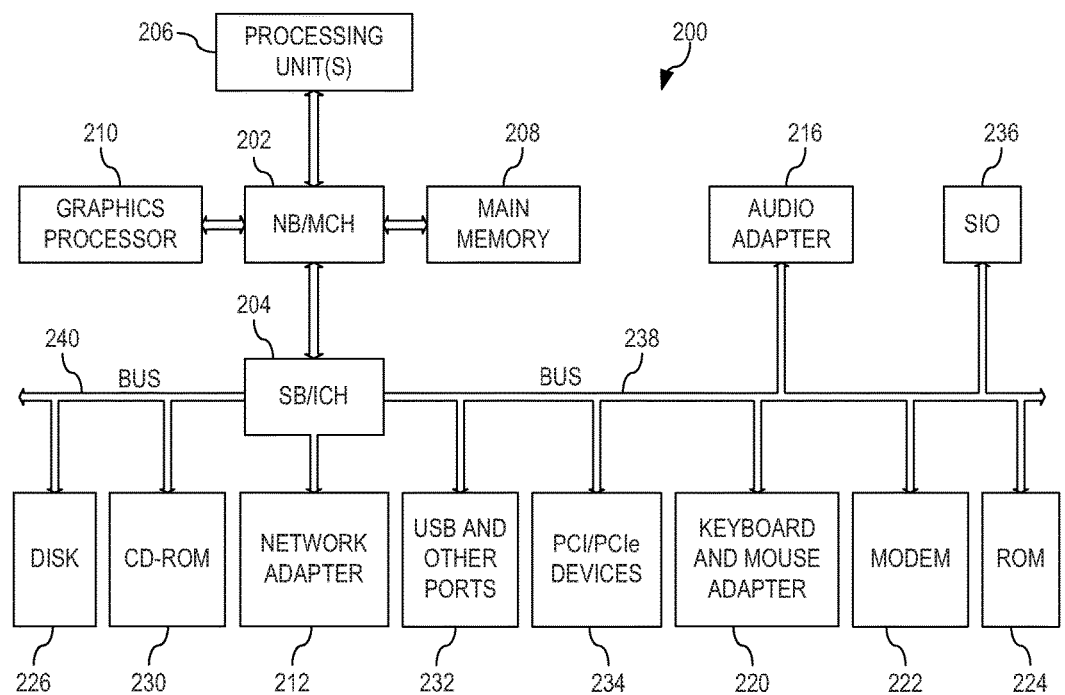
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement advanced search-term disambiguation. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates advanced search-term disambiguation.

As noted above, the mechanisms of the illustrative embodiments utilize specifically configured computing devices, or data processing systems, to perform the operations for advanced search-term disambiguation. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external affects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 7®. An object-oriented programming system, such as the Java programming system, may run in conjunction with the operating system and provides calls to the operating system from Java programs or applications executing on data processing system 200.

As a server, data processing system 200 may be, for example, an IBM eServer™ System P® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the advanced search-term disambiguation.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
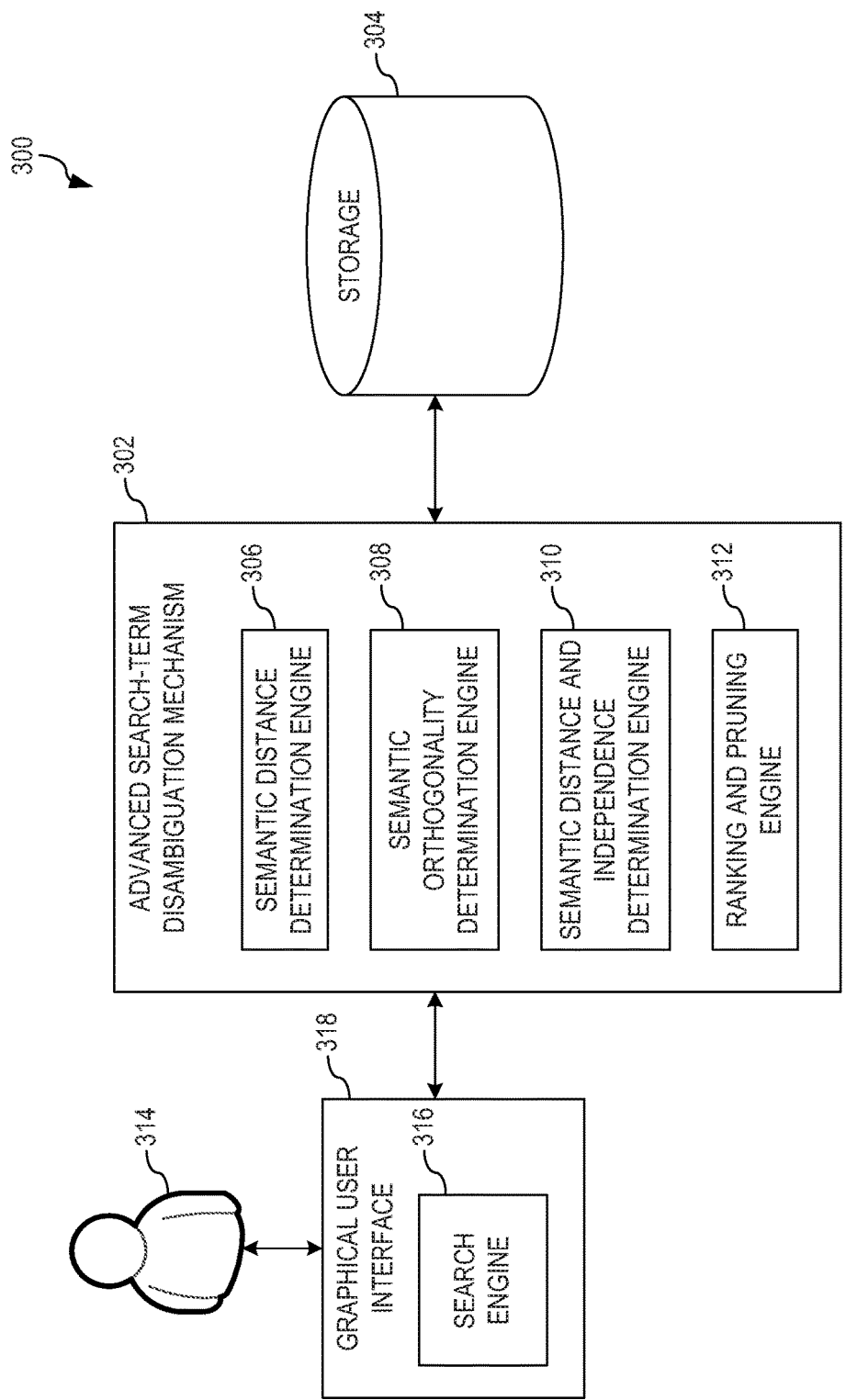
FIG. 3 depicts a functional block diagram of an advanced search-term disambiguation mechanism in accordance with an illustrative embodiment.

As noted above, the illustrative embodiments provide mechanisms for advanced search-term disambiguation. The mechanisms operate to disambiguate the search terms as they are entered into the query. By disambiguating the search terms as they are being entered, the search may be performed correctly the first time and does not require questioning after the search has been performed or providing results based on relevance that may not in fact be relevant at all. FIG. 3 depicts a functional block diagram of an advanced search-term disambiguation mechanism in accordance with an illustrative embodiment. Data processing system 300 comprises advanced search-term disambiguation mechanism 302 and storage 304. Storage 304 is a storage system upon which the query is to operate. Thus, the query performed by advanced search-term disambiguation mechanism 302 is limited to the data that exists within storage 304.

Advanced search-term disambiguation mechanism 302 comprises semantic distance determination engine 306, semantic orthogonality determination engine 308, semantic distance and independence determination engine 310, and ranking and pruning engine 312. In order to disambiguate search terms as they are being entered into data processing system 300, advanced search-term disambiguation mechanism 302 uses a measure of difference and orthogonality between related terms to decide which disambiguation concepts are to be presented to the user in an autocomplete list. That is, as user 314 enters terms into a search field of search engine 316 via graphical user interface 318, in order for a query to be performed, advanced search-term disambiguation mechanism 302 operates to disambiguate the concepts present in storage 304 so as to present a disambiguated ranked list of terms based on the concepts present in storage 304 to user 318 via an autocomplete list features associated with the search field. The goal is to present the most different terms from storage 304 to be shown autocomplete list (as opposed to most popular or most recently used). Because the autocomplete list comprises the most different search term options, the autocomplete list typically offers the most relevant result sets from fewer search terms.

To provide an autocomplete list that offers the most relevant terms, semantic distance determination engine 306 searches storage 304 for terms related to an initial portion of the search terms being entered into the search field of search engine 316. In keeping with the previous example, if user 314 initially enters the term "mercury" into the search field, semantic distance determination engine 306 searches storage 304 for all entries, both terms and phrases, comprising the term "mercury" and identifies a parent identifier associated with each entry. For example, if the terms "Freddy Mercury" and "David Mercury" are identified, then semantic distance determination engine 306 identifies a parent of each of these terms as "Person." If the term "Mercury Plus®" is identified, then semantic distance determination engine 306 identifies a parent of this term as "Product Name." If just the term "mercury" is identified without any modifiers, then semantic distance determination engine 306 may identify the parent as being "Product," "Element," "Planet," or "Mythology," based on the parent in the taxonomy of where the term is identified. In the instant example, storage 304 is a storage device associated with an enterprise that sells a product named "Mercury Plus®" and utilizes the element "mercury" within components of "products." Thus, semantic distance determination engine 306 identifies terms and phrases of children from different parents and computes the number of hops between the identified children, with more hops generally meaning a higher distance score.

Figure 4:
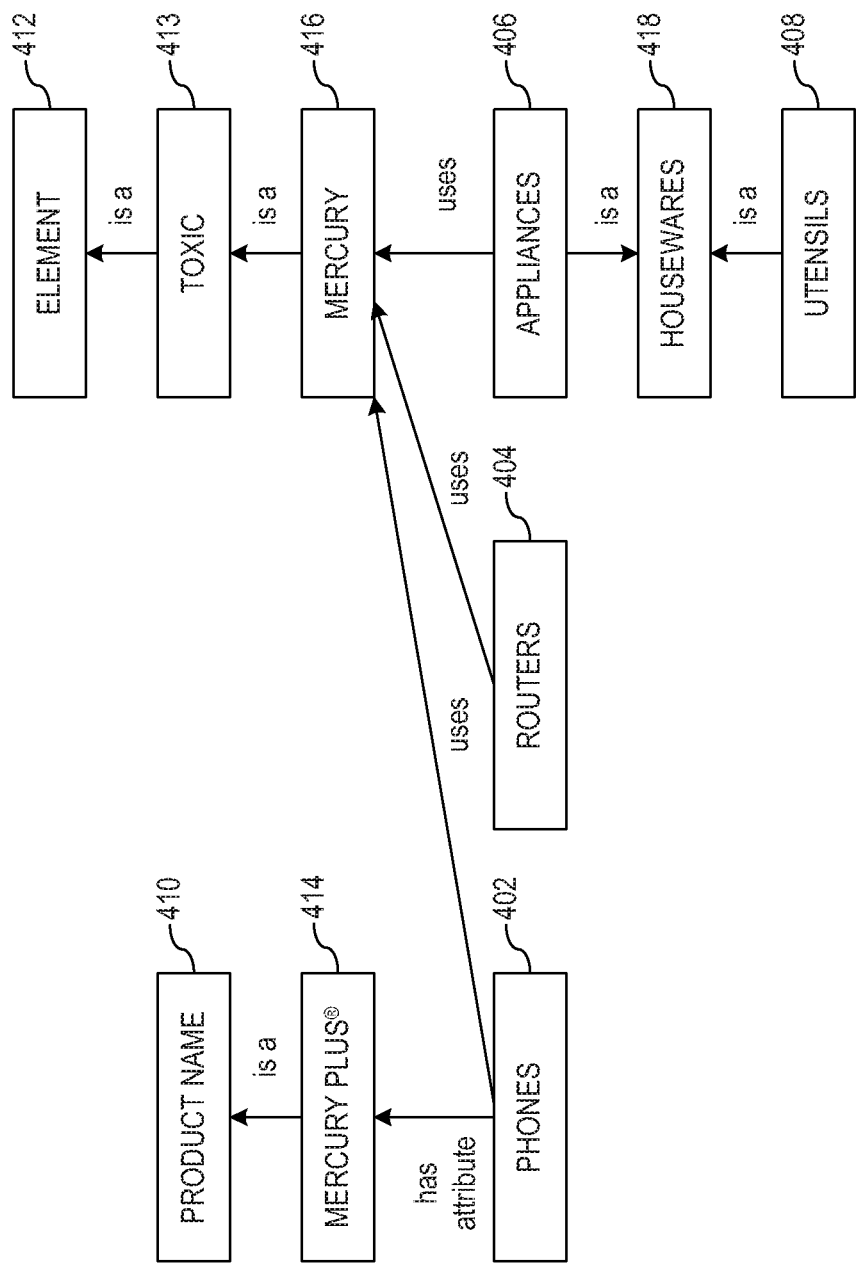
FIG. 4 depicts one example of a hierarchical semantic graph generated between terminologies associated with the term "mercury" from an enterprise storage, such as storage 304 of FIG. 3, in accordance with an illustrative embodiment.

FIG. 4 depicts one example of a hierarchical semantic graph generated between terminologies associated with the term "mercury" from an enterprise storage, such as storage 304 of FIG. 3, in accordance with an illustrative embodiment. As is illustrated, Mercury Plus® 414 comprises the term "mercury" and is a direct child of Product Name 410. Thus, for Mercury Plus® 414, semantic distance determination engine 306 of FIG. 3 determines a distance score to Product Name 410 of one (1). As is further illustrated, Mercury 416 comprises the term "mercury" and is a child of Element 412 through Toxic 413. Thus, for Mercury 416, semantic distance determination engine 306 would determine the number of hops (distance score) to Element 412 as two (2).

Figure 5A:
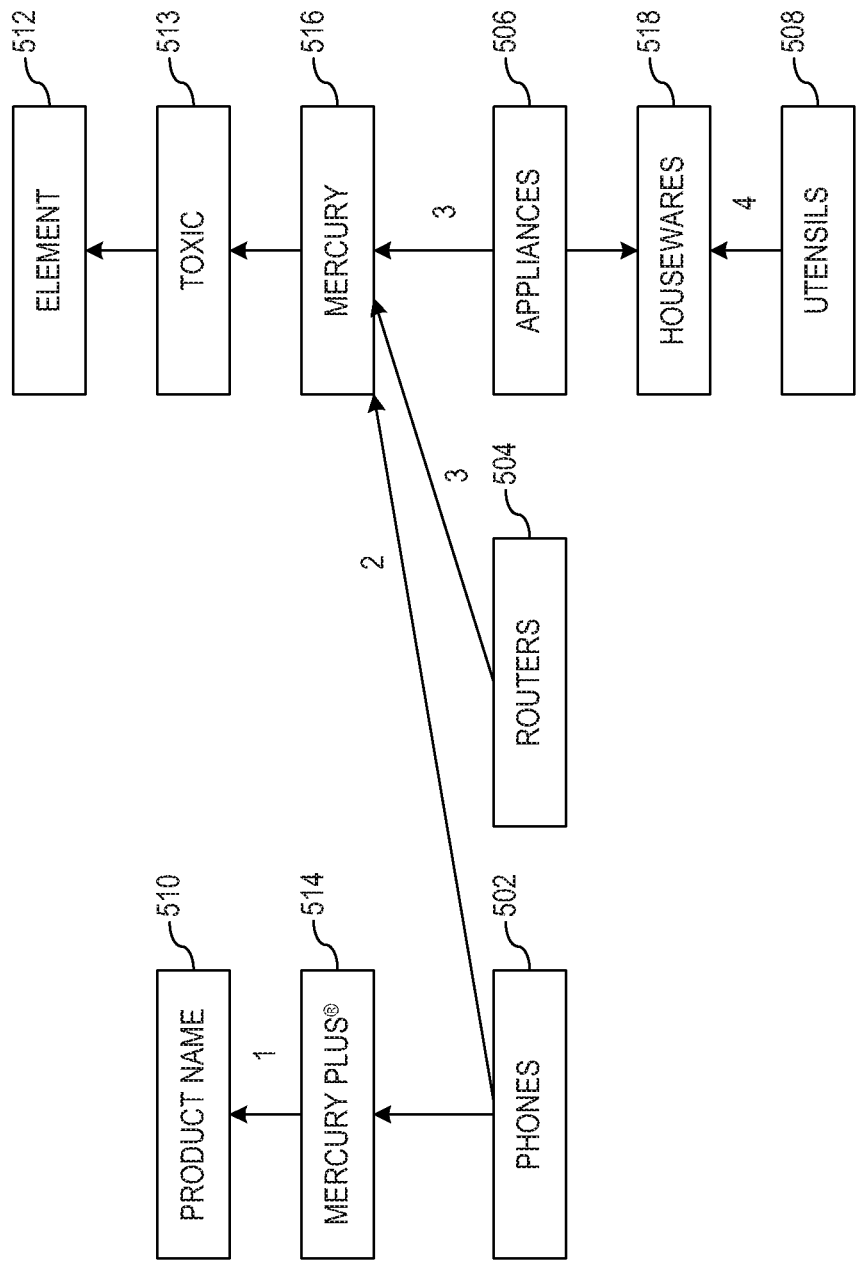
FIGS. 5A and 5B illustrate the determined orthogonality for each of the identified terms in keeping what the examples above in accordance with an illustrative embodiment.
Figure 5B:
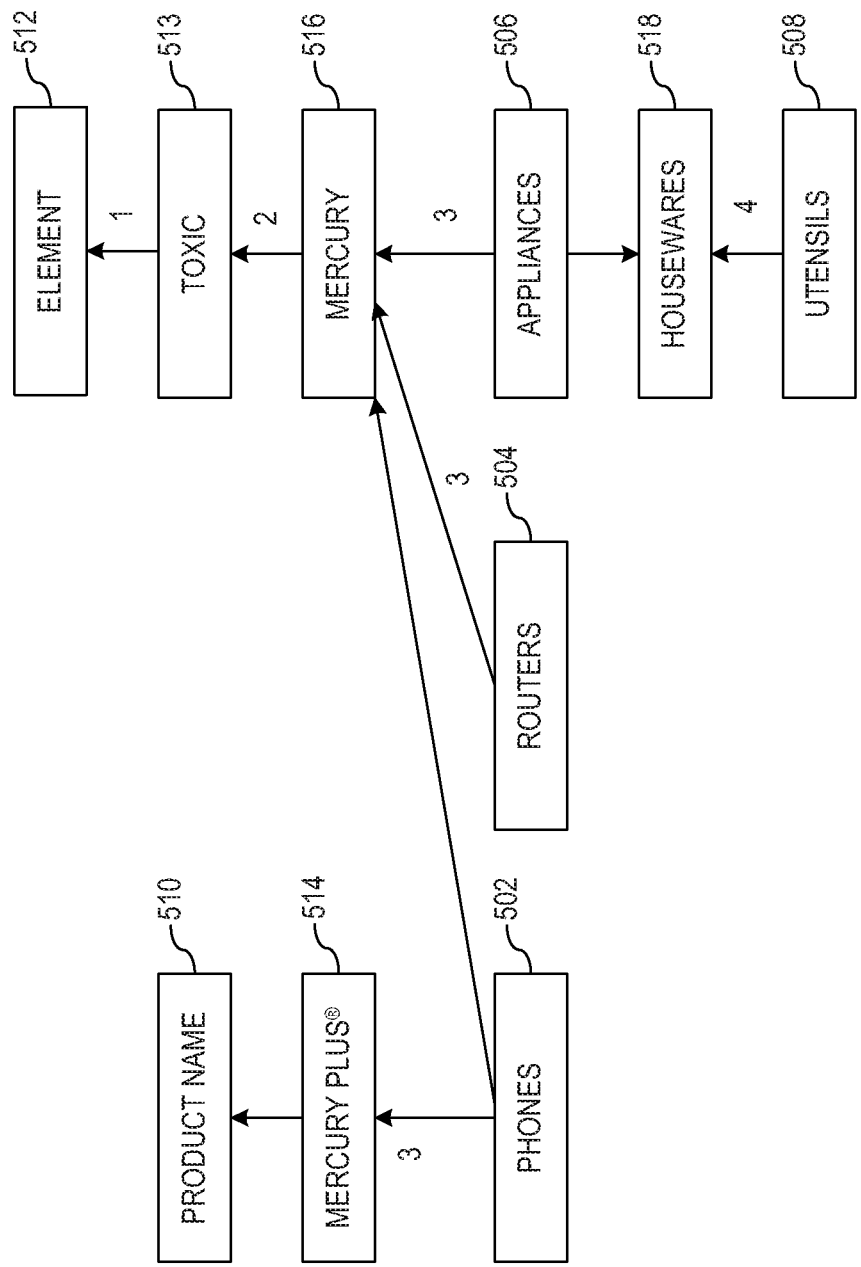

Returning to FIG. 3, once the distance scores are identified, semantic orthogonality determination engine 308 determines an orthogonality score for each identified entry. That is, semantic orthogonality determination engine 308 determines a relationship between the identified entities using the identified term or phrase regardless of dependency, especially those with the fewest possible paths indicating increased orthogonality. That is, excluding non-independent hops, from each parent, i.e. "Product Name" and "Element" in the current example, semantic orthogonality determination engine 308 determines the number of hops to the entities identified as having a relationship to the searched term, i.e. "mercury." FIGS. 5A and 5B illustrate the determined orthogonality for each of the identified terms in keeping what the examples above in accordance with an illustrative embodiment. In FIG. 5A, semantic orthogonality determination engine 308 determines orthogonality scores for Product Name 510 as:
  one (1) between Product Name 510 and Mercury Plus® 514,
  three (3) between Product Name 510 and Routers 504, the hop between Mercury Plus® 514 and Mercury 516 is counted as one hop because Phones 502 is not singularly dependent (i.e. not independent),
  three (3) between Product Name 510 and Appliances 506, the hop between Mercury Plus® 514 and Mercury 516 is counted as one hop because Phones 502 is not singularly dependent (i.e. not independent), and
  four (4) between Product Name 510 and Utensils 508, the hop between Mercury Plus® 514 and Mercury 516 is counted as one hop because Phones 502 is not singularly dependent (i.e. not independent) and the hop between Appliances 506 and Utensils 508 is counted as one hop because Housewares 518 is not singularly dependent (i.e. not independent).

In FIG. 5B, semantic orthogonality determination engine 308 determines orthogonality scores for Element 512 as:
  three (3) between Element 512 and Mercury Plus® 514, the hop between Mercury Plus® 514 and Mercury 516 is counted as one hop because Phones 502 is not singularly dependent i.e. not independent),
  three (3) between Element 512 and Routers 504,
  three (3) between Element 512 and Appliances 506, and
  four (4) between Element 512 and Utensils 508, the hop between Appliances 506 and Utensils 508 is counted as one hop because Housewares 518 is not singularly dependent (i.e. not independent).

Once the distance scores and orthogonality scores are identified are identified, semantic distance and independence determination engine 310 determines a semantic distance and independence ($S_{di}$) score for terms t: D(t,ai) which is a function that measures semantic distance (measure of opposite terms) for given term t and potential term candidate to be offered aj multiplied by O(t,ai) which is a function that measures semantic orthogonality (most independent) for given term t and potential term candidate to be offered aj, which in formula form is described as:

$$S_{di}=(D(t,aj)*O(t,aj)).$$

Once executed for each term and potential term candidate, semantic distance and independence determination engine 310 provides a list of terms that are most different based on proximity to distant terms (including implied aliases) and greatest independence from terms typed thus tier in the search field. With regard to the examples provided above in FIGS. 4 and 5A (Product Name), the results would be:
  Mercury Plus® 514—Sdi=1*1=1,
  Routers 504—Sdi=1*3=3,
  Appliances 506—Sdi=1*3=3, and
  Utensils 508—Sdi=1*4=4.
With regard to the examples provided above in FIGS. 4 and 5B (Element), the results would be:
  Mercury Plus® 514—Sdi=2*3=6,
  Routers 504—Sdi=2*3=6,
  Appliances 506—Sdi=2*3=6, and
  Utensils 508—Sdi=2*4=8.

With the semantic distance and independence values identified, ranking and pruning engine 312 ranks all of the scores and presents terms or phrases associated with the predetermined number of results to user 314 as autocomplete suggestions to the query being entered by user 314. The predetermined number of result may be user identified or automatically determined based on, for example, a ratio associated with identified candidate terms, a number candidate terms above an identified threshold, or the like. For example, using the above example and if the predetermined number of suggestions were four (4), ranking and pruning engine 312 would provide for the initial term "mercury" autofill suggestions of
  Mercury Plus®,
  Routers, Appliances, and Utensils.

Thus, the illustrative embodiments provide mechanisms for advanced search-term disambiguation through a measure of difference and orthogonality between related terms identified from the enterprise database. As the initial search term(s) are being entered into the query, the illustrative embodiments provide more relevant results in less elapsed time, that in turn, provide better satisfaction and less chance of search abandonment.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the users computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider), in some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 6:
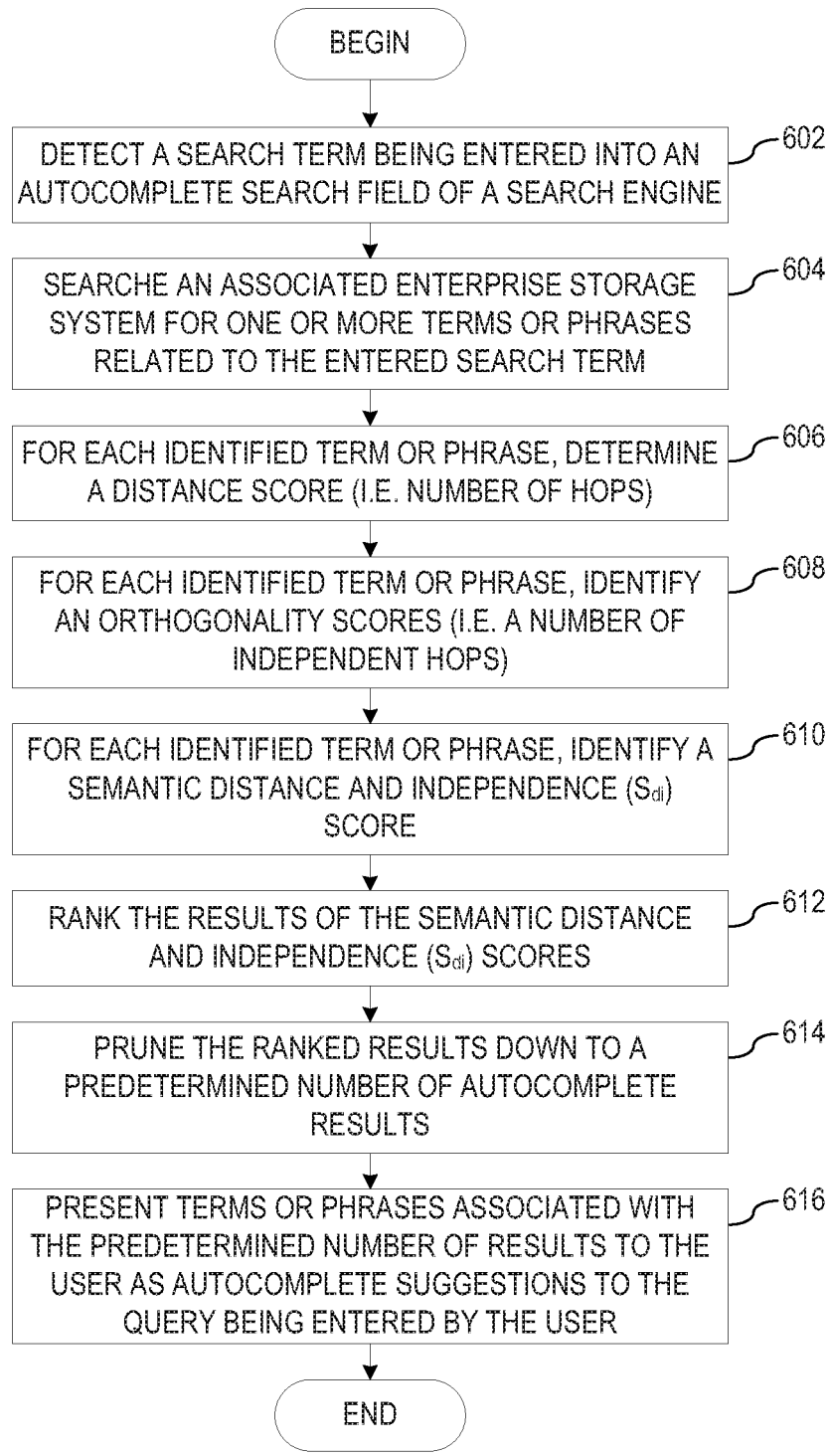
FIG. 6 depicts an exemplary flow diagram of the operation performed by an advanced search-term disambiguation mechanism in accordance with an illustrative embodiment.

FIG. 6 depicts an exemplary flow diagram of the operation performed by an advanced search-term disambiguation mechanism in accordance with an illustrative embodiment. As the operation begins, the advanced search-term disambiguation mechanism detects a search term being entered into an autocomplete search field of a search engine (step 602). The advanced search-term disambiguation mechanism searches an associated enterprise storage system for one or more terms or phrases related to the entered search term (step 604). For each identified term or phrase, the advanced search-term disambiguation mechanism determines a distance score (i.e. number of hops)) from the term or phrase to a highest hierarchical parent associated with the term or phrase (step 606). For each identified term or phrase, the advanced search-term disambiguation mechanism identifies an orthogonality scores (i.e. a number of independent hops) from each highest hierarchical parent to the search term or phrase (step 608).

The advanced search-term disambiguation mechanism then identifies, for identified terms or phrases t, a semantic distance and independence ($S_{di}$) score (step 610):

$$S_{di}=(D(t,aj)*O(t,aj))$$

where D(t,ai) which is a function that measures semantic distance measure of opposite terms) for given term t and potential term candidate to be offered aj multiplied by O(t,ai) which is a function that measures semantic orthogonality (most independent) for given term t and potential term candidate to be offered aj. The advanced search-term disambiguation mechanism then ranks the results of the semantic distance and independence ($S_{di}$) scores (step 612) and prunes the ranked results down to a predetermined number of autocomplete results (step 614). The advanced search-term disambiguation mechanism then presents terms or phrases associated with the predetermined number of results to the user as autocomplete suggestions to the query being entered by the user (step 616), with the operation terminating thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for advanced search-term disambiguation. The mechanisms of the illustrative embodiment utilizes a measure of difference and orthogonality between related terms identified from the enterprise database on which the search is being performed to automatically disambiguate the search terms before search results are shown. The mechanisms operate to disambiguate the search terms as the initial search terms are being entered into the query. By disambiguating the search terms as they are being entered, the search may be performed correctly the first time and does not require questioning after the search has been performed or providing results based on relevance that may not in fact be relevant at all. Thus, the mechanisms of the illustrative embodiments provide more relevant results in less elapsed time, that in turn, provide better satisfaction and less chance of search abandonment.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer program product comprising a computer readable storage medium having a computer readable program stored therein, wherein the computer readable program, when executed on a computing device, causes the computing device to:
responsive to detecting a search term being entered into an autocomplete search field of a search engine, determine a set of terms from a storage device upon which a search is to be performed;

for each term in the set of terms, determine a semantic distance and independence ($S_{di}$) score to each term candidate in a set of term candidates, wherein the semantic distance and independence ($S_{di}$) score is determined using the following function:

$$S_{di}=(D(t,aj)*O(t,aj))$$

where D(t,aj) which is a function that measures semantic distance (measure of opposite terms) for given term t and potential term candidate to be offered aj multiplied by O(t,aj) which is a function that measures semantic orthogonality (most independent) for given term t and potential term candidate to be offered aj;

rank results of the semantic distance and independence ($S_{di}$) scores;

prune the ranked results down to a predetermined number of autocomplete results; and present a subset of term candidates associated with the predetermined number of autocomplete results from the set of term candidates to a user as autocomplete suggestions to the search.

2. The computer program product of claim 1, wherein the semantic distance is a distance score (i.e. number of hops) from an occurrence of the term to a highest hierarchical parent associated with the term.

3. The computer program product of claim 1, wherein the semantic orthogonality is an orthogonality score (i.e. a number of independent hops) from each highest hierarchical parent one or more entities identified as having a relationship to the search term.

4. The computer program product of claim 1, wherein the storage device is an enterprise storage device.

5. The computer program product of claim 1, wherein the subset of terms candidate are most different terms associated with the search term in the storage device as identified by semantic distance and semantic orthogonality.

6. The computer program product of claim 1, wherein the predetermined number of autocomplete results are at least one of user identified, automatically determined based on a ratio associated with identified candidate terms, or automatically determined based on a number of candidate terms above an identified threshold.

7. An apparatus comprising:
a processor; and
a memory coupled to the processor, wherein the memory comprises instructions which, when executed by the processor, cause the processor to:

responsive to detecting a search term being entered into an autocomplete search field of a search engine, determine a set of terms from a storage device upon which a search is to be performed;

for each term in the set of terms, determine a semantic distance and independence ($S_{di}$) score to each term candidate in a set of term candidates, wherein the semantic distance and independence ($S_{di}$) score is determined using the following function:

$$S_{di}=(D(t,aj)*O(t,aj))$$

where D(t,aj) which is a function that measures semantic distance (measure of opposite terms) for given term t and potential term candidate to be offered aj multiplied by O(t,aj) which is a function that measures semantic orthogonality (most independent) forgiven term t and potential term candidate to be offered aj;

rank results of the semantic distance and independence ($S_{di}$) scores;

prune the ranked results down to a predetermined number of autocomplete results; and present a subset of term candidates associated with the predetermined number of autocomplete results from the set of term candidates to a user as autocomplete suggestions to the search.

8. The apparatus of claim 7, wherein the semantic distance is a distance score (i.e. number of hops) from an occurrence of the term to a highest hierarchical parent associated with the term.

9. The apparatus of claim 7, wherein the semantic orthogonality is an orthogonality score (i.e. a number of independent hops) from each highest hierarchical parent one or more entities identified as having a relationship to the search term.

10. The apparatus of claim 7, wherein the subset of terms candidate are most different terms associated with the search term in the storage device as identified by semantic distance and semantic orthogonality.

11. The apparatus of claim 7, wherein the predetermined number of autocomplete results are at least one of user identified, automatically determined based on a ratio associated with identified candidate terms, or automatically determined based on a number of candidate terms above an identified threshold.

12. The apparatus of claim 7, wherein the storage device is an enterprise storage device.

* * * * *